United States Patent
Ivashin et al.

(10) Patent No.: US 8,788,950 B2
(45) Date of Patent: Jul. 22, 2014

(54) METHOD FOR PROVIDING MULTIPLE MOUSE INPUTS IN A REMOTE DESKTOP SESSION

(75) Inventors: Victor Ivashin, Danville, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 13/396,936

(22) Filed: Feb. 15, 2012

(65) Prior Publication Data
US 2013/0212489 A1 Aug. 15, 2013

(51) Int. Cl.
G06F 9/44 (2006.01)

(52) U.S. Cl.
USPC .......................................................... 715/753

(58) Field of Classification Search
CPC .................................................. G06F 9/4445
USPC ........................................................ 715/740
See application file for complete search history.

(56) References Cited

U.S. PATENT DOCUMENTS

| | | | |
|---|---|---|---|
| 2007/0214423 A1* | 9/2007 | Teplov et al. ................ | 715/751 |
| 2010/0156831 A1 | 6/2010 | Doubrava et al. | |
| 2010/0180210 A1* | 7/2010 | Toyama et al. ............... | 715/750 |
| 2010/0273130 A1* | 10/2010 | Chai et al. ........................ | 434/20 |
| 2011/0153716 A1* | 6/2011 | Malakapalli et al. ......... | 709/203 |
| 2011/0310066 A1* | 12/2011 | Fermgard et al. ............. | 345/179 |
| 2013/0047095 A1* | 2/2013 | Divorra Escoda et al. ... | 715/753 |
| 2013/0111561 A1* | 5/2013 | Kaushik ........................... | 726/4 |
| 2013/0125009 A1* | 5/2013 | DeLuca et al. ................ | 715/740 |

FOREIGN PATENT DOCUMENTS

WO 2004109622 A1 12/2004

\* cited by examiner

Primary Examiner — Amy Ng
Assistant Examiner — Sang H Kim

(57) ABSTRACT

A computer (host), which is communicating with an interactive whiteboard projector (client) through a remote desktop connection, launches third-party applications supporting multiple mice (i.e. drawing pens) and provides these applications with virtual mouse device and input event signals for each pen device connected on the projector. The applications will behave as if the host system were configured with multiple installed mice, though no added driver or physical connected hardware is present.

16 Claims, 4 Drawing Sheets

METHOD FOR PROVIDING MULTIPLE MOUSE INPUTS IN A REMOTE DESKTOP SESSION

CROSS-REFERENCE TO RELATED APPLICATIONS

This application is related to commonly owned U.S. patent application Ser. No. 13/332,751, filed Dec. 21, 2011, which is hereby incorporated by reference in its entirety.

FIELD OF INVENTION

This method relates generally to the Remote Desktop Service components (formerly Terminal Services) and Raw Input APIs (application programming interfaces) of the Microsoft Windows® operating systems, and pertains specifically to providing input events for multiple client mouse devices to applications running within a remote desktop session.

BACKGROUND

Conventional projectors generally need to be positioned at far distances from display surfaces to create an adequately large projection area. And without proper mounting and placement, the light path emitted may not remain obstruction free. Presenters passing in front of or near those display surfaces often face bright projector light, shining into their eyes, or they may be colored with the projection image while adding their shadow to the display surface.

Short-throw projectors help alleviate these problems and are especially necessary for interactive projection systems. These projectors are ideally positioned on a wall or ceiling above the target display surface. The short-throw technology enables the projector to output a sufficiently large screen image onto the wall below, and the high mounting provides an unobstructed screen image which can be approached easily by interactive users. Short-throw projectors, mounted above and close to the target surface, also offer diminished light projection into the eyes of presenters/attendees and reduce shadows caused when users intersect the light output path. For these reasons, many interactive whiteboard systems use short-throw projectors for their display component.

In an interactive electronic whiteboard system, a digital pen replaces ink and provides an input interface to draw content onto a virtual whiteboard. Traditionally the digital pens are physical hardware elements modeled after their ink counterparts to offer a natural user experience. They may transmit their location or are otherwise remotely monitored for their position over a display surface. Buttons, orientations, or other unique identifying characteristics of each pen may also be detected by supporting applications and can be used to affect an operation, modify or manipulate a drawing feature, or change an activity. Computer applications can generate different outputs on the whiteboard surface using such pen interaction. For example, the moving pen position information is monitored by a computer application which in turn paints electronic color pixel elements onto a virtual canvas at the corresponding pen position in an application window. The canvas being simultaneously displayed by the application makes it appear as if the electronic ink was deposited and drawn using the virtual pen. This type of technology is not new and electronic painting applications using tablets, mice as "pen" surrogates, or other inputs sources are quite popular and readily available.

As interactive whiteboard systems have gained in popularity, systems offering support for multiple pen inputs are becoming more desirable. Multiple inputs allow simultaneous users to share in the interaction, or provide an easy way to distinguish differing interactive elements with particular input devices. Unfortunately, multi-input aware application support is limited. Application developers must use system vendor provided APIs for particular hardware or rely on generic operating system support when vendors configure pen inputs to function as mouse devices to maximize application operability. Even the developer APIs in operating systems that allow applications to gain access to multiple devices and their inputs are relatively new or have not been well defined. And, operating systems themselves are typically configured for a single user interaction at a time and treat multiple devices of the same type as a single unified device. Multiple mice, for example, can be attached and recognized by many computers and their operating systems. However, manipulation of each individual mouse generally functions to control the single provided system pointer. The result is that multiple connected mice are unified to control/share a single screen element.

Some low level developer APIs within various operating systems do allow applications access to the individual unique mouse devices. But it is often the application's responsibility to create separate pointers and position functions for each mouse device that may only operate with the application's GUI (graphical user interface). Therefore, applications supporting multiple-pens are usually specialized for a particular purpose or to a particular set of devices. In other cases, applications choose to support only the limited single-device operating system APIs.

Microsoft operating systems provide a low-level Raw Input APIs to developers through which an application can obtain information regarding any human interface device (HID) connected to the system. Microsoft also developed a managed code solution with the MultiPoint Mouse SDK (software development kit) that exposes a common application environment supporting multiple mouse devices. This SDK offers an application a window platform for tracking the multiple devices and includes helpful support for managing cursor icons, position, and other mouse related GUI and tracking events.

Epson's BrightLink 475Wi Interactive Projector, for example, is configured as a short-throw projector with an electronic whiteboard application that creates an interactive whiteboard projector (IWP). This all-in-one product solution seeks to replace the traditional whiteboard by providing dual electronic pens operating over a drawing region output by the projector. The pens are detected and managed by a receiver and provide input to an internal whiteboard application. Providing similar input to any application on a host PC that might be configured to use the IWP and pens is an object of the present invention.

FIG. 1 shows an example of a number of interactive whiteboard projectors (IWPs) 10 connected on a network 12 to a host computer 16. Since the short-throw projector is mounted high on a wall or in the ceiling, a functional interface breakout box 14 extends down from the projector and is positioned next to the display surface 30. This box contains user buttons and the interactive pen devices for the whiteboard applications. As a network based projector, the IWP may be configured to share content and interaction with other IWP devices. Therefore, multiple user pens inputs could be provided and made available within remote supporting applications.

In effect, a network projector can be harnessed to output display content gained from some remote source device. Device inputs on the network projector may too have use by a remote target device.

A key challenge with providing so many input devices is sharing the device hardware with applications on a host PC connected to the IWP. In prior product solutions, the supplied input hardware was physically connected to the host PC where drivers were installed to interpret the pen inputs. However, since the IWP is a network based product, additional cabling for connecting input devices is unreasonable. Transmitting the hardware signals across the existing network is one solution. This could require a network based USB driver for the devices, for example, to be installed on the PC. However, users generally do not like to install device drivers on their systems.

With a network projector, sending application screen content from a host PC across the network to the projector display already requires some transmission method. As discussed in co-pending application Ser. No. 13/332,751, Microsoft's remote desktop services can be ideally suited for this situation in a Windows operating system environment. Sending input devices through this transmission interface is possible. Unfortunately, in a hosted remote desktop session only a single mouse and keyboard device is provided by the remote desktop connection client application. Multiple mice on the client (projector) would be unified into a single mouse device through the remote desktop protocols. Applications running the remote desktop session would only recognize the single mouse device.

Physical connection of additional devices on the host, already demonstrated as undesirable for cabling and driver reasons, is also problematic when operating in a remote desktop session. This is because a host machine's local HID devices are restricted in operation to the input desktop which will be the Windows Logon screen desktop during the remote desktop connection. This means that multiple-HID devices cannot be seen or utilized in applications running within a hosted remote desktop session.

What is desirable is a solution that allows the IWP and interface box client to connect with a host PC using remote desktop services to gain the display output performance expected for desktop applications. Further, the desirable solution would also allow the multiple pen devices on the IWP and interface box client to be available to any multi-input applications launched on the host PC within the remote desktop session. Ideally this would not require extensive additional software or driver installation. Additionally, it would be desirable to share pen devices of a IWP with applications on a host PC when the IWP display is not being utilized by the same PC. The present invention is directed to achieving these and other objectives.

SUMMARY OF INVENTION

The method and apparatus of the present invention transmits input events from multiple mice attached to a client device using a remote desktop connection to target applications running in a remote desktop session on the host. The present invention does not require mouse drivers be installed on the host system and yet enables targeted applications using Microsoft's Raw Input or MultiPoint Mouse SDKs to identify and interoperate with mouse input from a set of virtual mouse devices, each associated with a mouse on the client device.

Specifically, the present invention enables a Microsoft Window's® based computer (host), which is communicating with an EPSON interactive whiteboard projector (client) through a remote desktop connection, to launch third-party applications supporting multiple mice (i.e. drawing pens) and provide these applications with virtual mouse device and input event signals for each pen device connected on the projector. The applications will behave as if the host system were configured with multiple installed mice, though no added driver or physical connected hardware is present.

The present invention provides a system, method, and/or computer-readable media for providing multiple human interface device inputs in a remote desktop session between a client projector and a host computer, the client projector and the host computer being connected by a network. The method, for example, comprises: establishing a remote desktop session between the client projector and the host computer; in the client projector, using the processor to capture inputs from multiple human interface devices and forward the human interface device inputs to the host computer; in the host computer, using a processor to receive the human interface device inputs from the client projector and store and maintain information for each client projector human interface device as a virtual device; intercept raw input function calls from an application running on the host computer; collect information for each host computer human interface device; and return information for each host computer human interface device and information for each virtual device to the application running on the host computer.

In a preferred embodiment, intercepting raw input function calls comprises processing the function call with a hook handler. Another embodiment further comprises simulating system events for each virtual device including device arrival and device removal events.

An embodiment further comprises maintaining virtual device objects used to name and identify each client projector human interface device. In another embodiment the information returned to the application includes a count and list of host computer human interface device handles and virtual device handles.

In an embodiment the inputs from the client projector human interface device include at least one of flags, button states, and coordinate information, and in another embodiment the client projector human interface devices are electronic whiteboard pens.

In a further embodiment the method of the present invention further comprises establishing a remote desktop services virtual channel between the host computer and the client projector, and receiving by the host computer human interface device inputs forwarded from the client projector across the remote desktop services virtual channel. In yet another embodiment, a virtual device is a virtual mouse.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
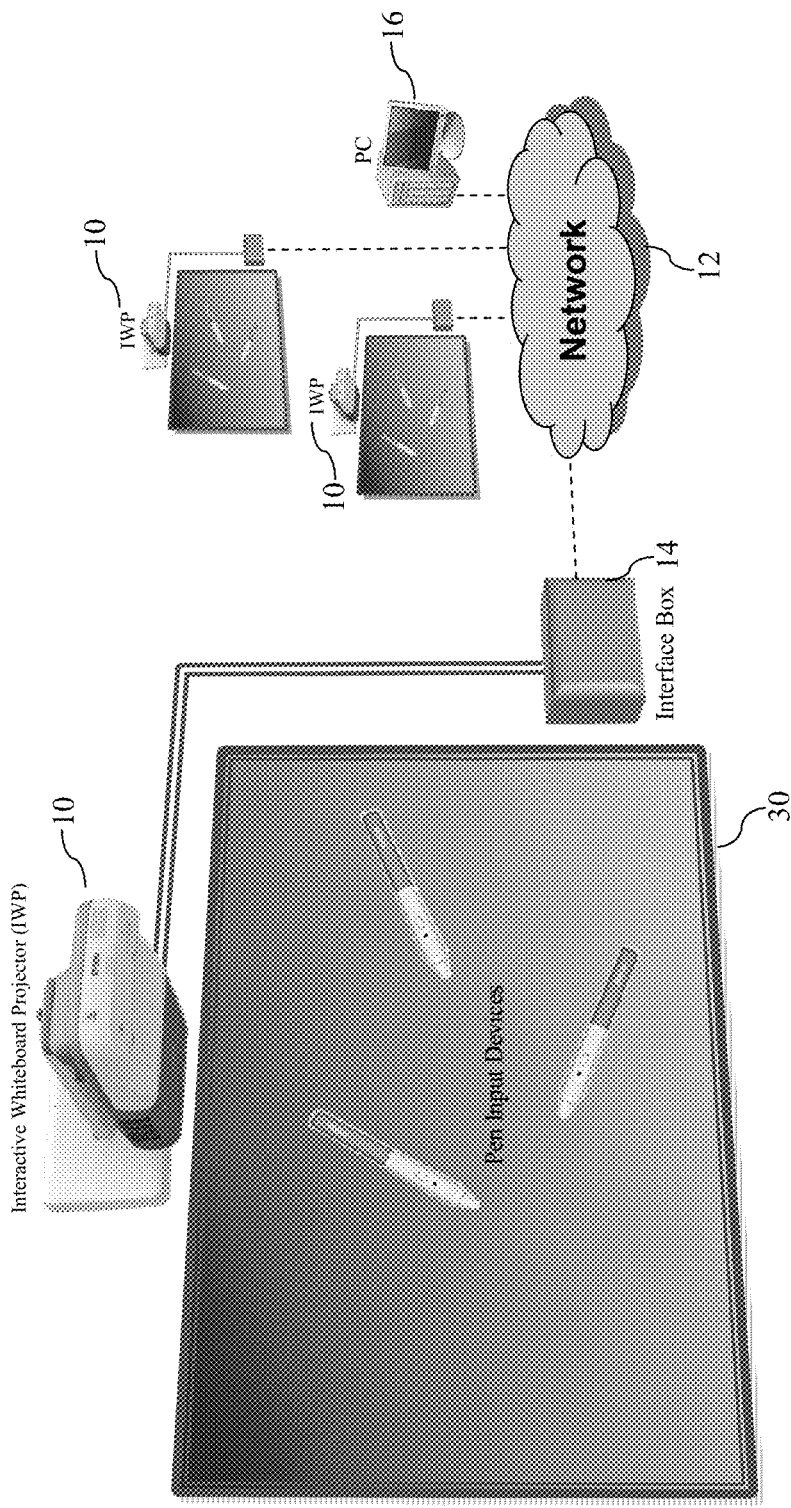
FIG. 1 illustrates a number of interactive whiteboard projectors (IWPs) on a network

Providing the hardware pen input devices, essentially computer mice, on an IWP (interactive whiteboard projector) to an application in a host computer is only useful if their hardware inputs can be detected and used by the application. Applications running within Microsoft Windows® operating systems have access to several APIs (application programming interfaces) that can provide the application with details concerning each connected mouse and its inputs. Raw Input API is one that offers a small collection of C functions, structures, and messages conveniently located in the core Windows operating system's User API client dynamic link library (DLL), user32.dll. Raw Input is the preferred interface for low-level access to device and events from registered top level collection classes. Microsoft also provides a higher-level MultiPoint Mouse SDK (software development kit), but internally it is constructed on top of the Raw Input interfaces. Therefore, applications supporting multiple mouse input devices are likely to be utilizing the Raw Input APIs.

If one could easily replace the Raw Input API with his own custom version, one object of the present invention could be achieved. This custom version could be implemented to mimic expected Raw Input API behavior for each exposed interface function while also providing necessary modifications to support custom requirements. For example, a custom version could ensure that returned results from each API method excludes all mice devices. From the using application point of view, the API methods would be operating correctly and the application would report that no mouse devices are connected. In another example, a custom version could respond with more devices than are actually available. The using application would respond accordingly, convinced that more devices exist because the API responded accordingly and within the interface guidelines. Therefore, the custom version could receive input from the IWP across the network, say event data for each pen device, and relay this information to applications through the modified Raw Input API in which the application is interacting.

One problem with the replacement approach is that user32.dll exposes a significant set of APIs, not just Raw Input methods. It would be a daunting and unlikely prospect to replace them all. Also, this user32.dll is a core Windows operating system file which is prone to inspection by various system utilities that can ensure its originality.

To overcome this problem, another option has been chosen for the present invention: intercepting, or hooking. Hooking allows one to alter or augment software components by intercepting function calls or message events at interfaces between such components. With this approach, arbitrary functions can be intercepted and extended by rewriting in-memory code for the target functions. The original target functions may even be preserved so that extended versions can call original target implementations to obtain original results. While convenient for API monitoring methods, user-mode hooking may also be used to change or alter function outcomes. Products such as Microsoft Detour, APISpy32, or the open source EasyHook engine provide libraries with hooking functions and frameworks to developers wishing to create applications that utilize a hooking approach in their products.

There are many API hooking methods that may be implemented. They include approaches such as import table patching, extended import table patching, export table patching, simple code overwriting, and extended code overwriting. This present invention is not concerned with nor limited to a particular hooking approach or its methods, except that hooking will be used to gain access to core Raw Input API functions and is a necessary requirement.

In many hooking methods, an injector component loads and installs a custom hook library code module into the process of a target application and at an appropriate time. In one approach, the injector modifies at runtime the import descriptor table for desired target functions in a shared library loaded in the process memory. These modifications provide calls to hook handlers in the custom hook library which intercept the desired target functions when an application attempts to call the methods using the import table mapping. Code implemented within the hook handlers may simply monitor and log the action and forward execution to the original native target implementation. Alternately, code could be crafted to change the intended function behavior, customize or filter original results, or replace the method completely. Ultimately, the hook returns execution back to the calling application. Using the hooking approach, a target solution can be achieved which is similar to full API library replacement.

The present invention provides "virtual mice" to third-party applications that use the Microsoft's Raw Input APIs in the Microsoft Windows® operating systems to support one or more mouse devices. The method of the present invention operates even when the third-party application is running within a remote desktop session. One of the goals of the present invention is to securely provide input from multiple unique pen devices on an IWP across a network to applications running on a host PC. The present invention allows "virtual mice" from other source locations to be included in the applications operation.

"Virtual mice" are distinguished from actual mouse devices in that the operating system has no knowledge of them. Applications, on the other hand, will be using the operating system API services to obtain them, so the "virtual mice" must appear as actual mouse devices to the application layer (i.e. Raw Input). The intent is to not require any custom application modification to support pen devices that operate with the interactive whiteboard projector, such as Epson's BrightLink 475Wi IWP. It is not desirable to install or use mouse drivers in the operating system, even if such drivers operate with remote physical hardware. While this would provide applications with access to the devices automatically through native Raw Input or related APIs, the devices would be exposed to all applications and be available for use by the system. Most importantly, when operating within a remote desktop session, all mice exposed to the operating system are directed to the input desktop. The remote desktop session is limited to only a single remote desktop mouse, a kind of virtual mouse and provided by the remote desktop connection client. Therefore, exposing pen devices to the operating system will not be desirable in this situation.

A network projector as described herein may be referred to as the client or the projector. This projector will provide a client-side application to a virtual network connection for displaying remote desktop content. A host as described herein is defined as a networked computer, laptop, or handheld device which can provide, among other things, the serving function in a virtual networking connection with the client. In an embodiment, the network projector incorporates a Windows embedded operating system providing Remote Desktop Connection Client application support. The host is a networked computer that provides the server component of Microsoft's Remote Desktop Services, called Remote Desktop Terminal Server.

Figure 2:
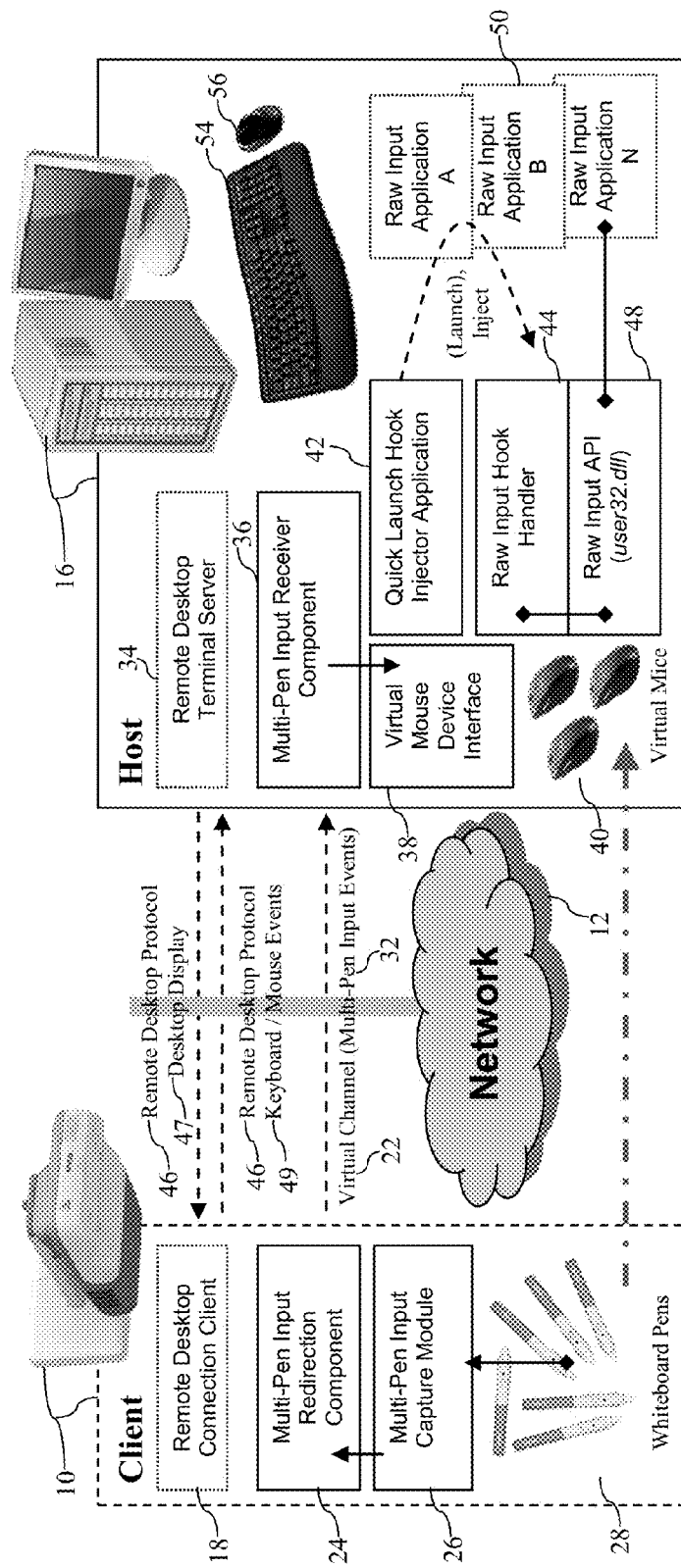
FIG. 2 is a general block diagram of the system of the present invention.

FIG. 2 is block diagram overview of the main components of the present invention. As discussed above, the client in the present invention is a network projector 10 that is connected to network 12. The network projector 10 (Client) may have a web server component that runs on projector 10 to provide an access interface for the host 16 to install necessary components and provides a way to initiate a remote desktop connection process. Details of the remote desktop connection process are not necessary for an understanding of the present invention but are disclosed in commonly owned U.S. patent application Ser. No. 13/332,751, filed Dec. 21, 2011, which is hereby incorporated by reference in its entirety. Hereinafter, network projector 10 will be referred to as client projector 10. As mentioned above, host 16 may be a networked computer as shown for example in FIG. 2, a laptop as shown for example in FIG. 3, or a handheld device. Host 16 will be generally referred to herein as host computer 16. In a preferred embodiment shown in FIG. 2, the client projector 10 incorporates a Windows embedded operating system providing Remote Desktop Connection Client 18 application support and host computer 16 incorporates a Windows operating system provided server component Remote Desktop Terminal Server 34.

The Remote Desktop Connection Client 18 is an application that executes in the client projector 10 to communicate with the host computer 16 using the Remote Desktop Protocol (RDP) 46, which is an interface through which the host computer 16 provides the desktop display to the client projector 10 and the client projector 10 provides keyboard/mouse events 49 to the host computer 16. The Remote Desktop Connection Client 18 provides the user interface on the client for access and interaction with a remote desktop session. This component manages the loading of any external dynamic link libraries such as those necessary for extending a remote desktop service virtual channel 22, like the Multi-Pen Input Redirection Component 24.

The Multi-Pen Input Capture Module 26 of client projector 10 is responsible for enumeration and access to connected pen devices 28 (i.e. electronic whiteboard pens), maintaining individual pen device identification data, and ultimately gathering each pen's event data. The captured data and device information is sent to the Multi-Pen Input Redirection Component 24 for forwarding to components of host computer 16 across network 12. Capturing of event data from hardware devices may require that this component be part of a driver or other low-level interface. Or, it may be configured to receive this information from another module.

Event data leaving the Multi-Pen Input Capture Module 26 will take the form of a structure that includes general mouse related activity information. Multi-Pen Input Capture Module 26 will ensure that the structure is appropriate for the exchange. In one embodiment, event data follows a form similar to Microsoft's _MOUSE_INPUT_DATA structure and includes flags, button states, and coordinate motion information.

In one embodiment, communication with the Multi-Pen Input Redirection Component 24 is provided through a message queue using CreateMsgQueue or similar API. Other forms of inter-process communication may be used. Alternately, the Multi-Pen Input Capture Module 26 could be included as a sub-component of the Multi-Pen Input Redirection Component 24.

The Multi-Pen Input Redirection Component 24 of client projector 10 creates a client-side endpoint for a remote desktop services virtual channel 22 and transmits multi-pen input events 32 received by the Multi-Pen Input Capture Module 26. The Multi-Pen Input Redirection Component 24 is packaged as a dynamic link library that is loaded by remote desktop services when a new remote desktop connection is established.

In an alternate embodiment, the Multi-Pen Input Redirection Component 24 is launched separately and uses its own network link to a Multi-Pen Input Receiver Component 36 configured also to use the separate network link. In this way, remote desktop components are not required for transmitting Multi-Pen Input Events 32 as they are instead sent on the separate network link.

The Remote Desktop Terminal Server 34 of host computer 16 communicates with clients using the Remote Desktop Protocol (RDP) 46. It provides the hosting component for a remote desktop session, such as Remote Desktop, and allows client machines (i.e. client projector 10) to connect with the host computer 16 for access to a user desktop.

The Multi-Pen Input Receiver Component 26 of host computer 16 creates a server-side endpoint for a remote desktop services virtual channel 22 and awaits transmission of input events from Multi-Pen Input Redirection Component 24 provided by the Multi-Pen Input Capture Module 26. The Multi-Pen Input Receiver Component 26 dispatches received pen device events 32 to a Virtual Mouse Device Interface 38 as they are received.

In an alternate embodiment, the Multi-Pen Input Receiver Component 26 can receive input events from other sources including a separate network connection. To avoid unnecessary data marshalling, Multi-Pen Input Receiver Component 26 could be incorporated as a module of the Virtual Mouse Device Interface 38.

The Virtual Mouse Device Interface 38 of host computer 16 provides methods for preparing or discarding "virtual mice" devices 40 from input events it collects. The basic interface provides DeviceAdd, DeviceRemove, and DeviceEvent interface functions that use a device identification handle and optional event data. The Virtual Mouse Device Interface 38 component stores and maintains information for each logical (virtual) mouse and dispatches or provides interfaces to obtain event data it receives.

The Virtual Mouse Device Interface 38 may be incorporated within the Quick Launch Hook Injector Application 42 or it may be an integrated part of the Raw Input Hook Handler 44.

The Quick Launch Hook Injector Application 42 of host computer 16 manages injection of the Raw Input Hook Handler 44 component into a running target application. The target application is optionally launched by the Quick Launch Hook Injector Application 42 and hooked immediately after application loading and before execution.

The Quick Launch Hook Injector Application 42 may display a toolbar, application window, or other GUI (graphical user interface) element and can be used to aid user selection of raw input aware target applications that are desired to incorporate the "virtual mice" inputs. For example, a GUI may be presented similar to a toolbar, containing icons of installed applications in the system. The user need simply select an icon to optionally launch and then inject the application with the Raw Input Hook Handler 44 component. In another embodiment, a list of running applications can be selected. Selecting one from the list will allow dynamic hooking of the already running process. In another embodiment, the application icons on the toolbar are configurable. The user may, for example, drag and drop an application shortcut or executable file into the toolbar area that will cause the application icon to be added the GUI. Alternately, a file selection dialog may be provided and used to identify applications elements for the toolbar. Selecting an icon will launch the related application.

Injection will occur according to the hooking framework and method used. The Quick Launch Hook Injector Application 42 can be configured to report the status of the injection process, like informing the user of any difficulties in establishment of the hooking process (i.e. the application chosen is not using Raw Input protocols).

The Quick Launch Hook Injector Application 42 is typically launched automatically into the desktop of a new remote desktop session. Alternately, it may be invoked directly by the user. As a toolbar, the application can be configured as a normal component in the user desktop. In either case, the Quick Launch Hook Injector Application 42 is available to provide bookmarks to applications for which the present invention's hooking operations will be supplied, and can save the state of any configured applications or injection status events for future use.

In one embodiment, the Quick Launch Hook Injector Application 42 maintains the Virtual Mouse Device Interface 38 and provides a conduit for communication with all launched Raw Input Hook Handlers 44. In this way, the Quick Launch Hook Injector Application 42 can manage all "virtual mice" in the system.

The Raw Input Applications A . . . N 50 are existing multi-device aware applications on the host computer 16 that may benefit from multiple independent mouse devices. Each application is configured to use the native operating system's Raw Input API 48.

The Raw Input Hook Handler 44 of the host computer 16 is injected into the running process space of each selected target application and begins execution in an attempt to "hook" the required Raw Input APIs 48 provided by Microsoft's user32.dll. The primary role of this component is to intercept all Raw Input API 48 function calls used by the Raw Input aware application where it was injected and replace them with a custom implementation. This custom implementation provides "virtual mice" and associated input events of a Virtual Mouse Device Interface 38 to the application that is configured to communicate with the native Raw Input API methods. To complete this custom implementation, the Raw Input Hook Handler 44 must also simulate some system events and messages for the application in a manner consistent with the native Raw Input API mechanism. For example, posting events into application window message queues and otherwise reporting device arrival and device removal events as if reporting and management for the "virtual mice" devices was carried out by the host operating system processes.

In one implementation, there are several components in Raw Input Hook Handler 44. They will be outlined below.

A RawInputHooks module provides the hook handler intercept entry points with replacement methods for each Raw Input API function that is hooked. When a Raw Input API 48 function is called by the application, the hook handler processes the function call.

The GetRawInputBuffer_Hooked function returns virtual mouse events data pertaining to the calling threads' Windows message queue. It adds this information to any data retrieved from the native GetRawInputBuffer method.

The GetRawInputData_Hooked function examines the incoming passed data event handle, and if it matches a unique handle previously provided and used for the virtual mice methods, appropriate data associated with the event handle and the information request command is returned. Otherwise, the method simply invokes the native GetRawInputData to let the system process according to its data event handles.

The GetRawInputDeviceInfoW_Hooked (Unicode) and GetRawInputDeviceInfoA_Hooked (ANSI) provide hook methods for related Raw Input GetRawInputDeviceInfoW and GetRawInputDeviceInfoA functions. The hooked handlers examine the incoming passed device handle, and if it matches the device handle of any known virtual mice, the method returns appropriate information gathered for the device from the Virtual Mouse Device Interface 38. Otherwise, as the device handle is unknown, results from calling the native Raw Input method are returned.

The GetRawInputDeviceList_Hooked function first collects the set of known devices, counts, etc. by calling the native GetRawInputDeviceList method. Then the hooked function adjusts the returned result according to the information in the Virtual Mouse Device Interface 38. For example, the returned result supplies both a count and list of system HID (human interface device) handles and the virtual mouse device handles for all "virtual mice" 40.

The RegisteredRawInputDevices_Hooked function simply calls the native RegisteredRawInputDevice method, executes a monitoring method, and returns the native result. The monitor method is tasked at examining the application's registration in the Raw Input API to detect which application windows or thread queues are requesting mouse event information. A notification process will use this information for sending "virtual mice" event data to the appropriate window target in a similar fashion as the Raw Input control methods. The GetRegisteredRawInputDevices method is called during the hook injection process to initialize the notification state.

A RawInputNotifier module provides the event notification thread that is responsible for transmitting "virtual mice" event data to the application on behalf of the Raw Input API 48 (which is not aware of the "virtual mice"). This module also provides hook entry points to common message queue functions to support this process.

The GetMessage_Hooked and PeekMessage_Hooked functions intercept native GetMessage and PeekMessage functions. The hook method first calls the native function to monitor Windows message queue removal of the Raw Input APIs' WM_INPUT message prior to processing by the application. If the message targets a "virtual mouse" 40, as indicated by a uniquely provided Raw Input Handle given when the message was posted by this RawInputNotifier module into the queue, it signals removal of the next "virtual mouse" event in the virtual mouse thread buffer. If the next event is "old" or has been processed by other methods (i.e. GetRawInputBuffer) then the hooked function loops on the GetMessage or PeekMessage functions as appropriate until the next event is valid.

A notification thread is configured to awaken when "virtual mice" events are dispatched by the Virtual Mouse Device Interface 38. This thread collects any pending events and notifies the application. It may call PostMessage to insert WM_INPUT messages for the event using a unique Raw Input Handle. The application will later receive this message and call appropriate Raw Input methods to obtain event data and other details. The notification method may also call SendMessageTimeout to provide WM_INPUT_DEVICE_CHANGE notification and PostMessage to insert WM_INPUT_DEVICE_CHANGE messages for new arrivals or pending departures of "virtual mice". The Virtual Mouse Device Interface 38 is called as necessary to maintain state or perform final teardown of pending device changes. Lastly, the notification thread may use SendInput to change a Windows message queue status (which are unavailable for direct for modification) to reflect a raw input event pending state. This allows any application threads that wait for the queue status state to awaken.

VirtualMouse objects are maintained by a unique DeviceHandle and DeviceId. These are chosen to not interfere with those already generated for other devices by the operating system and are also used to name and identify the particular mouse to an application.

A VirtualDeviceManager module, possibly implementing the Virtual Mouse Device Interface 38, provides storage for a list of the VirtualMouse objects. It maintains mappings to VirtualMouse objects by the unique device handle and by an external virtual mouse device identifier. MouseEvents (containing the notification window when posted, mouse device handle, mouse event data, arrival/departure/data state, etc.) are maintained in MouseEventBuffers that are unique to a particular application thread id. The buffers and a mapping by thread are in the VirtualDeviceManager. Notification messages of incoming "virtual mice" events are posted to the application and the event is stored in the appropriate MouseEventBuffer. When the application processed the notification message, these buffers are accessed to retrieve the event data.

Figure 3:
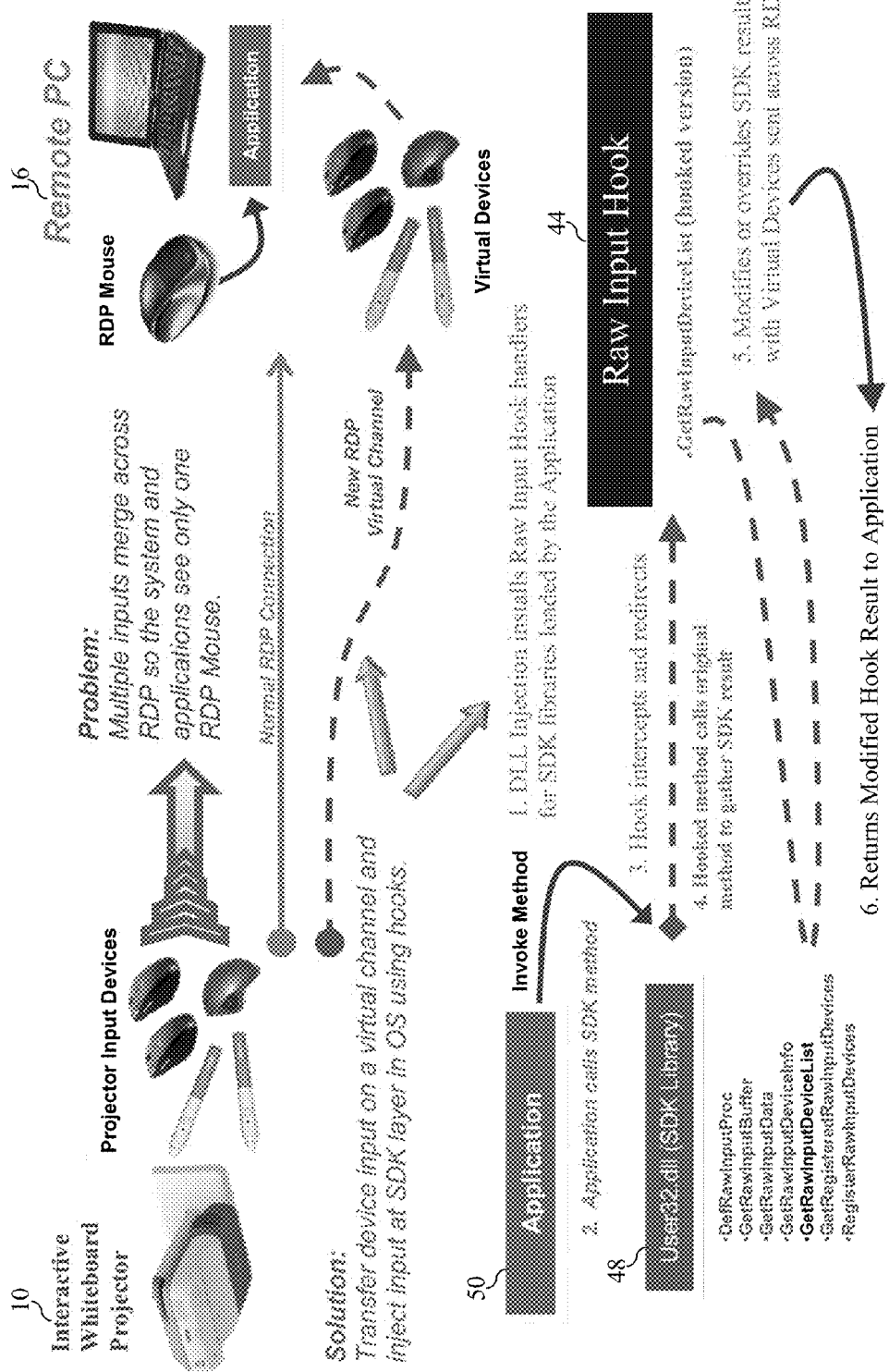
FIG. 3 illustrates the general steps of the method of the present invention.

The following is a discussion of the present invention which is shown in general steps (1-6) in FIG. 3.

The upper half of FIG. 3 illustrates the problem that the present invention solves. The interactive whiteboard projector (IWP), i.e. client projector 10, is connected to a remote PC, i.e. host computer 16, via a remote desktop protocol (RDP) connection. With an RDP connection without the solution of the present invention, the inputs of multiple projector input devices, i.e. electronic whiteboard pens 28, are merged across the RDP so that the system (host computer 16) and applications running on the host computer 16 see only one RDP mouse.

The solution of the present invention consists of three primary parts. Referring now to FIG. 2, the first part collects pen device inputs (i.e. Multi-Pen Input Capture Module 26) on an IWP (client projector 10) and transmits them as mouse events (32) to a receiver (Multi-Pen Input Receiver Component 36) on a host PC (host computer 16). The second part manages an interface (Virtual Mouse Device Interface 38) that maintains a pool of virtual mice 40 and their associated event queues for the mouse input data. The third part hooks the Raw Input API 48 methods being used by a target application 50 (Quick Launch Hook Injector Application 42 injects Raw Input Hook Handler 44 into the application process space) and inserts the virtual mice 40 and related events into hooked method results.

The present invention starts with the client projector 10 (IWP) and host computer 16 (e.g. laptop) connected to a local area network 12 and interconnected by a remote desktop connection 46 from the client to the host. Pen input devices 28 are monitored or connected to the client projector 10, which is configured to enumerate these input devices and maintain a list of unique identifiers for each. Input devices and events generated are captured in the client's Multi-Pen Input Capture Module 26 using appropriate drivers, APIs, or other notification interfaces.

The present invention continues by converting (by the Multi-Pen Input Capture Module 26) the pen events into mouse device events, as necessary, and transmitting them (i.e. multi-pen input events 32) across the network to the host computer 16. A remote desktop service virtual channel 22 created and connected between the client and host is one preferred path for this data. The security and encryption provided automatically by remote desktop services through the remote desktop protocol 46 is advantageous.

The present invention continues on the host computer 16 where the mouse data for multiple pen devices is received by the Multi-Pen Input Receiver Component 36. Modules required on the host computer 16 may be pre-installed and launched just prior to the remote desktop connection from the client as discussed in greater detail in commonly owned U.S. patent application Ser. No. 13/332,751, filed Dec. 21, 2011, which is hereby incorporated by reference in its entirety. Alternatively, these modules may be downloaded or otherwise pre-installed and configured. The receiver component may optionally be integrated with a hooking component launched by the user.

The received input is passed to the Virtual Mouse Device Interface 38 that will construct or deactivate "virtual mice" 40 and information queues that will be processed by hook handlers overriding Raw Input API 48 methods used by host applications 50. The "virtual mice" events will be dispatched to any Raw Input Hook Handlers 44 and added to method results. Applications 50 will thus receive API method results containing event data from "virtual mice" as if the information were provided by operating system mouse drivers connected to physical mouse devices.

The present invention continues when a user identifies and launches an application 50 that requires one or more mouse inputs through the Raw Input API 48. An optional GUI interface, like a toolbar or similar application element, may be provided to launch the application or enumerate existing applications. The present invention continues when a signal to inject the launched application with a hooking module of the present invention is provided. The signal may be provided by the optional GUI toolbar as a step in the application launch process or it may occur during a separate action. The RawInputHooks module of the Raw Input Hook Handler 44 is described in greater detail above. An injector (Quick Launch Hook Injector Application 42) loads the hooking module (RawInputHooks) into the process space of the target application and begins execution.

The hooking module locates the Raw Input API 48 methods and sets up hooks to intercept application calls to Raw Input methods with replacement implementations that the hooking module provides. The present invention then continues by allowing normal application execution.

The hooking module creates a thread to obtain and monitor incoming "virtual mice" events, including device arrivals and departures, from the Virtual Mouse Device interface 38. Related messages are constructed and inserted into the application's Windows message queues according to application Raw Input calls that setup registered device classes, receiving event windows, etc. As the Application 50 makes Raw Input API calls, they are intercepted by hook methods in Raw Input Hook Handler 44 which invoke native Raw Input methods to receive operating system (OS) results which are then modified to include the "virtual mice" data.

The lower half of FIG. 3 illustrates the general process of the present invention. Generally, applications running within Microsoft Windows® operating systems have access to several APIs (application programming interfaces) that can provide the application with details concerning each connected mouse and its inputs. The Application 50 running on the host computer 16 is shown on the left side of the figure and the Raw Input Hook of the present invention is on the right side of the figure. In step 1 the dynamic link library (DLL) injection installs the Raw Input Hook Handler 44 of the present invention for the Raw Input methods in SDK (software development kit) libraries loaded by the Application 50. In step 2, the Application 50 calls a Raw Input API function. In this example, the application intends to invoke the GetRawInputDeviceList SDK method to gather any connected input devices. In step 3, the Raw Input Hook Handler 44 intercepts the Application 50 call to a Raw Input API 48 function call and redirects it to a hook handler method according to the present invention. For example, in step 3, the GetRawInputDeviceList hooked version is called which should obtain all registered HIDs (Human Interface Devices) in the system. In step 4, the original native Raw Input SDK library method is called and the operating system (OS) returns two devices, i.e. the remote desktop keyboard 54 and mouse device 56. In step 5, the hooking module of the present invention then adds the virtual mice it is aware (i.e. three mice) of from the Virtual Mouse Interface 38 and in step 6 returns the modified result of the method (i.e. a total of five devices) to the Application 50.

Figure 4:
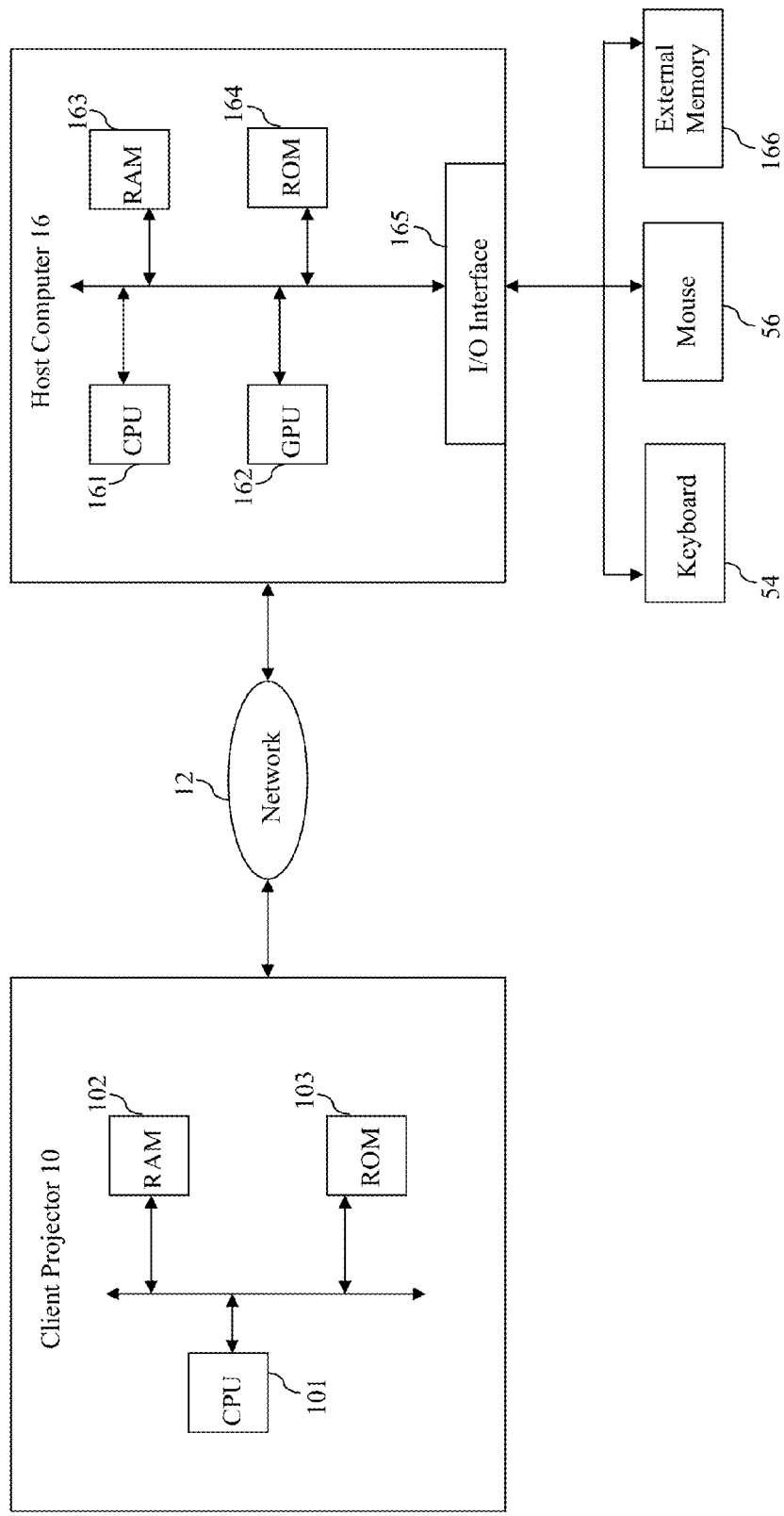
FIG. 4 is a simple block diagram of the processors and memory of the host computer and client projector of the present invention.

The method steps of the present invention described above are preferably performed by one or more processors in the host computer 16 and/or the client projector 10 executing computer-executable instructions, programs, software, firmware, that is stored or loadable in memory in host computer 16 and/or client projector 10 and/or in accessible external memory. FIG. 4 is a very simplified block diagram illustrating generally the processors and memory in host computer 16 and client projector 10. Host computer 16 processors may include, for example, a central processing unit (CPU) 161 and one or more graphical processing units (GPU) 162. The internal memory may include, for example, RAM 163 and ROM 164. I/O interface 165 enables communication with keyboard 54, mouse 56, and external memory 166, for example. Client projector 10 may similarly include a CPU 101, RAM 102, and ROM 102.

Various embodiments can be implemented in digital electronic circuitry, or in computer hardware, firmware, software, or in combinations of them. Apparatus can be implemented in a computer program product tangibly embodied in a non-transitory machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. For example, the hooking modules proposed provide a way to insert "virtual mice", not installed or otherwise configured within the operating system, into a chosen application. The event data for these virtual mice need not arrive from a client of a remote desktop connection. Instead, in another embodiment, the remote desktop service virtual channels are not used and mouse event data arrives from an alternate network connection. For example, another computer could generate events or share events from a locally connected mouse with the application on the host PC. In this way, remote desktop services are an independent and unrelated optional component of this method.

In yet another embodiment, no network connections are used and the mouse event data arrives from another application running within the host. This application may simulate real mouse devices, offer additional selectable mice with some mechanism to choose the active one, provide an interface between some other mouse-like hardware device that transposes that data into mouse data and sent to the Virtual Mouse Device Interface for the hooked application, or simply provide any number of input events and according to a demonstration script. Thus, the invention described herein is intended to embrace all such alternatives, modifications, applications and variations as may fall within the spirit and scope of the appended claims.

What is claimed is:

1. A method for providing multiple, human-interface, input pointer devices in a remote desktop session between a client computing device and a host computer, the client computing device and the host computer being connected by a network, comprising:

providing a projector as said client computing device, said projector being a client projector configured to execute a client-side application to establish said remote desktop session with said host computer, said client projector having said multiple input pointer devices as distinct projector input pointer devices, said projector assigning a different ID to each projector input pointer device and capturing and associating raw input data generated by each projector input pointer device with its respective ID;

providing said host computer, said host computer being configured to execute a serving function in said remote desktop session with said client projector;

establishing a remote desktop session between the client projector and the host computer over said network, said remote desktop session establishing a remote desktop communication channel with said client projector characterized by the following limitations:

(a) said host computer transferring control of an application running on said host computer to said client projector, (b) said host computer having a graphic desktop, and as part of said remote desktop session, said host computer transfers its graphic desktop to said client projector for display by said client projector, (c) the remote desktop session between said host computer and client projector is a private one-to-one session between the host computer and the client projector and the graphic desktop is transferred only to said client projector during said remote desktop session, (d) said remote desktop session providing for only a single input pointer device for said client projector and being configured to treat any remote-desktop input-pointer signals received over said remote desktop communication channel as a single unified input pointer device irrespective of whether said remote-desktop input-pointer signals were generated by multiple distinct input pointer devices;

establishing a remote desktop services virtual channel between the host computer and the client projector;

wherein said client projector sends captured raw input data generated by each respective projector input pointer device with its associated ID to said host computer over said remote desktop services virtual channel;

wherein the host computer includes a multi-input receiver module that receives the raw input data and associated IDs from the client projector over said remote desktop services virtual channel, and a virtual device interface module couple to the multi-input receiver module, wherein the virtual device interface module creates and discards virtual input-pointer devices having unique virtual device IDs without the use of input drivers and in accordance with the received raw input data and associated IDs;

intercepting raw input function calls from said application running on the host computer to an operating system of the host computer, said raw input function calls requiring operating-system-supplied raw input information of individual hardware input pointer devices connected to said host computer, said operating-system-supplied input-information being supplied by said operating system of the host computer; and augmenting said operating-system-supplied input information with raw input data and corresponding virtual IDs of said respective, individual virtual input-pointer devices to make the virtual input-pointer devices appear as if they were locally connected to said host device while being maintained private to said remote desktop session between the client projector and the host computer;

returning to said application, as part of responses to said raw input function calls, the augmented operating-system-supplied input information.

2. The method as in claim 1, wherein the information for each respective, individual virtual input-pointer device includes simulated system events for each individual virtual input-pointer device including device arrival and device removal events.

3. The method as in claim 1, wherein each respective, individual virtual input-pointer device is a virtual device object used to name and identify its corresponding projector input pointer device.

4. The method as in claim 1 wherein the projector input pointer devices are electronic whiteboard pens.

5. The method of claim 1, wherein in limitation (a), a display of the host computer displays a logon screen desktop while said host computer is in said remote desktop session, and any human interface devices of the host computer are restricted in operation to said logon screen desktop.

6. The method of claim 1, wherein in limitation (c), said graphic desktop is not fully displayable on said host computer during said remote desktop session.

7. The method of claim 1, wherein said human-interface input devices are input pointer devices.

8. The method of claim 1, wherein said application is characterized by supporting multiple input pointer devices using raw input data.

9. The method of claim 1 wherein each virtual input pointer device is characterized by the operating system of the host computer having no knowledge of them.

10. The method of claim 1, wherein said remote desktop session is executing by means of the Remote Desktop Protocol (RDP).

11. A system for providing multiple, human interface, input pointer devices in a remote desktop session between a client projector and a host computer, the client projector and the host computer being connected by a network, comprising:

wherein said client projector has said multiple, human-interface, input pointer devices as distinct projector input pointer devices, assigns a different ID to each projector input pointer device, and captures and associates raw input data generated by each projector input pointer device with its respective ID;

in the client projector, a processor that
establishes a remote desktop session between the client projector and the host computer, wherein said remote desktop session establishes a remote desktop communication channel characterized by the following limitations:
(a) said host computer transfers control of an application running on said host computer to said client projector,
(b) said host computer has a graphic desktop, and as part of said remote desktop session, said host computer transfers its graphic desktop to said client projector for display by said client projector,
(c) the remote desktop communication channel between said host computer and client projector is private with only the client projector having access to the graphic desktop that the host computer transferred to it, and
(d) said remote desktop session provides for only a single input pointer device for said client projector and is configured to treat any remote-desktop input-pointer signals received over said remote desktop communication channel as a single unified input pointer device irrespective of whether said remote-desktop input-pointer signals were generated by multiple distinct input pointer devices;

establishes a remote desktop services virtual channel between the client projector and the host computer;

wherein said client projector sends captured raw input data generated by each respective projector input pointer device with its associated ID to said host computer over said remote desktop services virtual channel;

wherein the host computer includes a multi-input receiver module that receives the raw input data and associated IDs from the client projector over said remote desktop services virtual channel, and a virtual device interface module coupled to the multi-input receiver module, wherein the virtual device interface module creates and discards virtual input-pointer devices having unique virtual device IDs without the use of input drivers and in accordance with the received raw input data and associated IDs;

in the host computer, a processor that
intercepts raw input function calls from said application running on the host computer to an operating system of the host computer, said raw input function calls requiring operating-system-supplied raw input information of individual hardware input pointer devices connected to said host computer, said operating-system-supplied input-information being supplied by said operating system of the host computer;

augmenting said operating-system-supplied input information with raw input data and corresponding virtual IDs of said respective, individual virtual input-pointer devices to make the virtual input-pointer devices appear as if they were locally connected to said host device while being maintained private to said remote desktop session between the client projector and the host computer;

returning to said application, as part of responses to said raw input function calls, the augmented operating-system-supplied input information.

12. The system as in claim 11 wherein the host computer processor intercepts raw input function calls by processing the function call with a hook handler.

13. The system as in claim 11 wherein the host computer processor or client projector processor simulates system events for each virtual device including device arrival and device removal events.

14. The system as in claim 11 wherein the host computer processor or client projector processor maintains virtual device objects used to name and identify each projector input pointer device.

15. The system as in claim 11 wherein the projector input pointer devices are electronic whiteboard pens.

16. One or more tangible, non-transitory computer-readable media embodying instructions executable by a computing device to perform the method of claim 1.

* * * * *